United States Patent
Aoki (10) Patent No.: US 10,202,123 B2
(45) Date of Patent: Feb. 12, 2019

(54) VEHICLE CONTROL SYSTEM

(71) Applicant: TOYOTA JIDOSHA KABUSHIKI KAISHA, Toyota-shi, Aichi (JP)

(72) Inventor: Kenichiro Aoki, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 41 days.

(21) Appl. No.: 15/372,558

(22) Filed: Dec. 8, 2016

(65) Prior Publication Data

US 2017/0225685 A1    Aug. 10, 2017

(30) Foreign Application Priority Data

Feb. 5, 2016   (JP) ................................ 2016-020915

(51) Int. Cl.
| | | |
|---|---|---|
| *B60W 30/18* | (2012.01) | |
| *B60W 10/20* | (2006.01) | |
| *B60W 10/30* | (2006.01) | |
| *B60W 50/08* | (2012.01) | |
| *B60Q 1/34* | (2006.01) | |

(52) U.S. Cl.
CPC ....... *B60W 30/18163* (2013.01); *B60Q 1/346* (2013.01); *B60W 10/20* (2013.01); *B60W 10/30* (2013.01); *B60W 50/082* (2013.01)

(58) Field of Classification Search
CPC .......... B60W 30/18163; B60W 10/20; B60W 10/30; B60W 50/082; B60Q 1/346
See application file for complete search history.

(56) References Cited

U.S. PATENT DOCUMENTS

| | | | | |
|---|---|---|---|---|
| 3,594,724 A | * | 7/1971 | Evers ..................... | B60Q 1/425 200/61.27 |
| 6,092,619 A | * | 7/2000 | Nishikawa ........... | B62D 15/025 180/204 |
| 2004/0016870 A1 | * | 1/2004 | Pawlicki ............ | B60K 31/0008 250/208.1 |
| 2013/0184926 A1 | * | 7/2013 | Spero ...................... | B62D 1/28 701/26 |
| 2013/0268162 A1 | * | 10/2013 | Ponziani ............... | B60W 30/00 701/48 |

FOREIGN PATENT DOCUMENTS

JP    2015-160554 A    9/2015

\* cited by examiner

*Primary Examiner* — Behrang Badii
*Assistant Examiner* — Daniel L Greene
(74) *Attorney, Agent, or Firm* — Sughrue Mion, PLLC (57) ABSTRACT

The vehicle control system includes a turning signal control unit configured to switch a turning signal of the vehicle between an off state and an on state according to the lane change control. The turning signal control unit maintains the turning signal in the on state until predetermined release conditions are satisfied when the lane change control in process is cancelled and the vehicle is switched to the manual driving mode.

3 Claims, 5 Drawing Sheets

VEHICLE CONTROL SYSTEM

TECHNICAL FIELD

The present invention relates to a vehicle control system that performs lane change control.

BACKGROUND

Japanese Unexamined Patent Publication No. 2015-160554 has been known as technical literature related to a vehicle control system that performs lane change control. Japanese Unexamined Patent Publication No. 2015-160554 discloses a vehicle control system that performs lane change control such that a vehicle automatically changes its lane and turns on and off a turning signal indicating a lane change direction during a lane change.

SUMMARY

However, in general, when lane change control cancelled, the vehicle is switched to a manual driving mode in which the driver manually drives the vehicle, the instructions which are issued from the system to the vehicle during lane change control are also cancelled. Therefore, when lane change control is cancelled, the turning signal indicating the lane change direction is also turned off. However, even if the lane change control is cancelled, in some cases, the driver wants to manually change lanes. In this case, the driver needs to turn on the turning signal again after the lane change control is cancelled. As a result, the operation of the driver becomes complicated, which is inconvenient.

In this technical field, it is preferable to provide a vehicle control system that can improve the convenience of the driver who manually changes lanes when lane change control is cancelled.

In order to solve the above-mentioned problem, according to an aspect of the invention, there is provided a vehicle control system that performs lane change control for changing a lane of a vehicle from a traveling lane to an adjacent lane, cancels the lane change control according to at least one of an operation of a driver of the vehicle, a surrounding environment of the vehicle, and a traveling state of the vehicle during the lane change control, and switches the vehicle to a mode in which the driver manually drives the vehicle. The vehicle control system includes a turning signal control unit configured to switch a turning signal of the vehicle between an off state and an on state according to the lane change control. The turning signal control unit maintains the turning signal in the on state until predetermined release conditions are satisfied when the lane change control in process is cancelled and the vehicle is switched to the mode in which the driver manually drives the vehicle.

In the vehicle control system according to the aspect of the invention, when the lane change control is cancelled by the driver during the lane change control, the vehicle is switched to the manual driving mode and the turning signal is maintained in the on state. Therefore, according to the vehicle control system, the time and effort required for the driver who manually changes lanes when lane change control is cancelled to turn on the turning signal again is not needed, as compared to the system according to the related art in which the turning signal is automatically turned off when lane change control is cancelled. As a result, it is possible to improve the convenience of the driver.

In the vehicle control system, when the vehicle enters the adjacent lane from the traveling lane after the lane change control in process is cancelled and the vehicle is switched to the manual driving mode, the turning signal control unit may determine that the release conditions are satisfied and switch the turning signal to the off state.

According to the vehicle control system, when the vehicle enters an adjacent lane from the traveling lane, the turning signal is turned off even if the turning signal is maintained in the on state. Therefore, according to the vehicle control system, when the driver manually changes lanes and the vehicle enters an adjacent lane from the traveling lane, it is possible to turn off the turning signal, without the driver's operation. As a result, it is possible to improve the convenience of the driver.

As described above, according to various aspects of the invention, it is possible to improve the convenience of the driver who manually changes lanes when lane change control is cancelled.

DETAILED DESCRIPTION

Hereinafter, an embodiment of the invention will be described with reference to the drawings.

Figure 1:
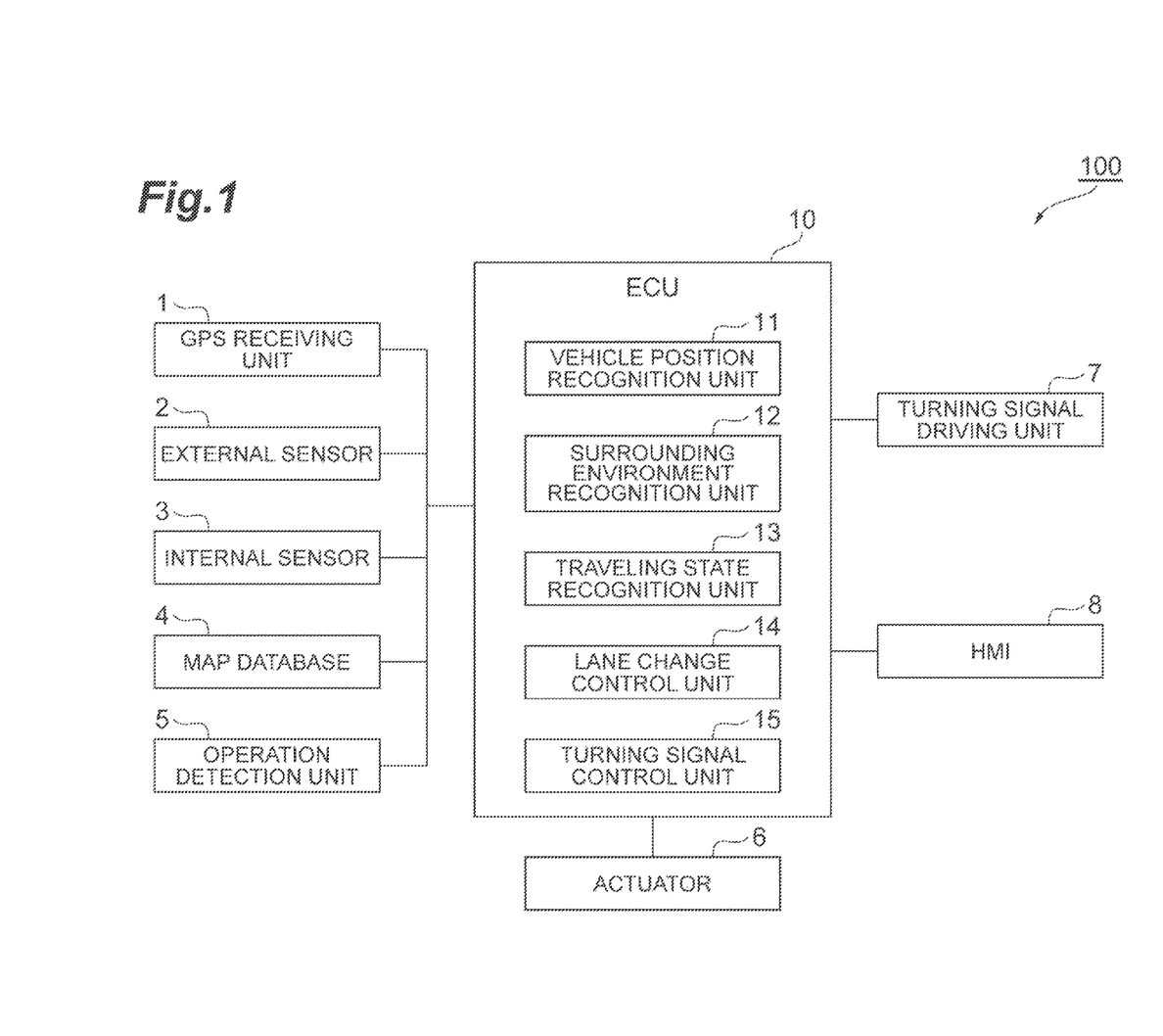
FIG. 1 is a block diagram illustrating a vehicle control system according to an embodiment.

FIG. 1 is a block diagram illustrating a vehicle control system according to this embodiment. A vehicle control system 100 according to this embodiment illustrated in FIG. 1 is provided in a vehicle, such as a car, and controls the traveling of the vehicle. The vehicle control system 100 is configured such that the vehicle can be automatically driven. The automated driving is a vehicle control technique that drives the vehicle to the destination without the driver's operation. Any known structure can be used for the automated driving. The vehicle control system 100 can perform the switching between the automated driving and manual driving in which the driver manually drives the vehicle.

The vehicle control system 100 performs lane change control for the vehicle. The lane change control is vehicle control that changes the lane of the vehicle from a traveling lane in which the vehicle is traveling to a lane adjacent to the traveling lane. The lane change control of the vehicle control system 100 is performed as a portion of the automated driving or is performed to support the driver during manual driving. When the lane change control is performed, a turning signal of the vehicle which is close to an adjacent lane (lane change direction) is turned on. The turning signal may be automatically turned on by the vehicle control system 100 or may be manually turned on by the driver.

During the lane change control, the vehicle control system 100 cancels the lane change control according to at least one of an operation of the driver, the surrounding environment of the vehicle, or the traveling state of the vehicle during the lane change control and switches the mode to the manual driving mode in which the driver manually drives the vehicle. Even if the lane change control is cancelled, the vehicle control system 100 maintains the turning signal in an on state until predetermined release conditions are satisfied. The lane change control cancellation and release conditions will be described in detail below.

[Structure of Vehicle Control System]

As illustrated in FIG. 1, the vehicle control system 100 includes a global positioning system [GPS] receiving unit 1, an external sensor 2, an internal sensor 3, a map database 4, an operation detection unit 5, an actuator 6, a turning signal driving unit 7, a human machine interface [HMI] 8, and an electronic control unit [ECU] 10.

The GPS receiving unit 1 receives signals from three or more GPS satellites and measures the position of the vehicle (e.g. the latitude and longitude of the vehicle). The GPS receiving unit 1 transmits the measured positional information of the vehicle to the ECU 10.

The external sensor 2 is a detector that detects the surrounding environment of the vehicle. The external sensor 2 includes a camera, a radar, or laser imaging detection and ranging [LIDAR]. The camera is provided, for example, on the rear side of the front glass of the vehicle and captures a view in front of the vehicle. The cameras may be provided on the rear surface and the side surface of the vehicle. The camera transmits information about the captured image of the surroundings of the vehicle to the ECU 10. The camera may be a monocular camera or a stereo camera. The stereo camera includes two imaging units that are provided in order to reproduce binocular parallax.

The radar detects obstacles around the vehicle using radio waves (e.g. millimeter waves). The radar transmits radio waves around the vehicle, receives radio waves reflected from obstacles, and detects the obstacles. The radar transmits the detected obstacle information to the ECU 10. The LIDAR detects obstacles using light instead of the radio waves. The LIDAR transmits the detected obstacle information to the ECU 10.

The internal sensor 3 is a detector that detects the traveling state of the vehicle. The internal sensor 3 includes a vehicle speed sensor, an acceleration sensor, and a yaw rate sensor. The vehicle speed sensor is a detector that detects the speed of the vehicle. For example, a wheel speed sensor that is provided in a wheel of the vehicle or a drive shaft which is rotated integrally with the wheel and detects the rotation speed of the wheel is used as the vehicle speed sensor. The vehicle speed sensor transmits the detected vehicle speed information (wheel speed information) to the ECU 10.

The acceleration sensor is a detector that detects the acceleration of the vehicle. The acceleration sensor includes, for example, a longitudinal acceleration sensor that detects the longitudinal acceleration of the vehicle and a lateral acceleration sensor that detects the lateral acceleration of the vehicle. The acceleration sensor transmits, for example, vehicle acceleration information to the ECU 10. The yaw rate sensor is a detector that detects the yaw rate (angular velocity) of the vehicle about the vertical axis passing through the center of gravity. For example, a gyro sensor can be used as the yaw rate sensor. The yaw rate sensor transmits the detected vehicle yaw rate information to the ECU 10.

The map database 4 is a database that stores map information. The map database is formed in, for example, a hard disk drive [HDD] that is provided in the vehicle. The map information includes, for example, the positional information of the roads, information about the shape of the roads (e.g. a curve, the type of straight portion, and the curvature of the curve) and the positional information of intersecting points and branch points.

The operation detection unit 5 is a device that detects an operation of the driver of the vehicle for the vehicle. When a lane change control start button is provided in the vehicle, the operation detection unit 5 detects an operation of turning on the lane change control start button and an operation of turning off the lane change control start button. Similarly, when a lane change control cancel button is provided, the operation detection unit 5 detects an operation of turning on the lane change control cancel button and an operation of turning off the lane change control cancel button. The buttons are not necessarily provided. For example, levers may be provided.

The operation detection unit 5 includes a turning signal detection unit. The turning signal detection unit is provided in a turning signal operation lever of the vehicle and detects the operation of the driver for a turning signal operation lever. The turning signal detection unit transmits the detected operation for the turning signal operation lever to the ECU 10.

The operation detection unit 5 includes a steering sensor, an accelerator pedal sensor, and a brake pedal sensor. The steering sensor includes, for example, a steering torque sensor and a steering touch sensor. The steering torque sensor is provided in a steering shaft of the vehicle and detects steering torque that is applied to the steering wheel by the driver. The steering touch sensor is provided in the steering wheel of the vehicle and detects the touch of the driver with the steering wheel and pressure that is applied to the steering wheel by the driver. The accelerator pedal sensor is provided in a shaft portion of an accelerator pedal and detects force that is applied to the accelerator pedal by the driver or the amount of depression (the position of the accelerator pedal) of the accelerator pedal by the driver. The brake pedal sensor is provided in a shaft portion of a brake pedal and detects force that is applied to the brake pedal by the driver or the amount of depression (the position of the brake pedal) of the brake pedal by the user.

The actuator 6 is a device that performs traveling control for the vehicle. The actuator 6 includes at least a throttle actuator, a brake actuator, and a steering actuator. The throttle actuator controls the amount of air supplied (throttle position) to the engine and controls the driving force of the vehicle, in response to a control signal from the ECU 10. When the vehicle is a hybrid vehicle, a control signal from the ECU 10 is input to a motor as a driving source to control the driving force, in addition to the amount of air supplied to the engine. When the vehicle is an electric vehicle, a control signal from the ECU 10 is input to a motor as a driving source to control the driving force. In these cases, the motor as the driving source forms the actuator 6.

The brake actuator controls a brake system and controls braking force applied to the wheels of the vehicle, in response to a control signal from the ECU 10. For example, a hydraulic brake system can be used as the brake system. The steering actuator controls the driving of an assist motor that controls steering torque in an electric power steering system in response to a control signal from the ECU 10. Therefore, the steering actuator controls the steering torque of the vehicle.

The turning signal driving unit 7 is a device that switches the turning signals of the vehicle between an on state and an off state. The turning signal driving unit 7 can be, for example, an electronic control unit that includes a driving circuit including a microprocessor, a transistor, and a relay and a communication device. The turning signal driving unit 7 switches the turning signals between the on state and the off state on the basis of a control signal from the ECU 10.

The turning signals are, for example, lamps that emit light with a specific color and are provided on the left and right positions of the front portion of the vehicle and the left and right positions of a rear portion of the vehicle. When the turning signals are lamps, the on state is, for example, a blinking state or a lighting state. The aspect of the turning signal varies depending on the region in which the vehicle is used and the type of vehicle. When the turning signal is not a lamp and is a plate member that emits light, the on state is, for example, a state in which the plate member that emits light protrudes from the side surface of the vehicle in the traveling direction of the vehicle (a state in which the plate member that emits light and is provided with an emission surface up is lowered to the traveling direction of the vehicle).

The HMI 8 is an interface that inputs and outputs information between the vehicle control system 100 and the driver. The 8 includes, for example, a display and a speaker. The HMI 8 outputs an image to the display and outputs a sound from the speaker in response to a control signal from the ECU 10.

The ECU 10 is an electronic control unit including, for example, a central processing unit [CPU], a read only memory [ROM], a random access memory [RAM], and a controller area network [CAN] communication circuit. In the ECU 10, for example, a program that is stored in the ROM through the CAN communication circuit is loaded to the RAM and the CPU executes the program loaded to the RAM to implement each function. The ECU 10 may include a plurality of electronic control units. In addition, the ECU 10 has a function of performing automated vehicle driving. The ECU 10 generates a vehicle traveling plan in advance, using a known method, in order to perform automated driving. The traveling plan is data in which the position of the vehicle on the map is associated with a control target value (a target vehicle speed or a target steering angle) of the vehicle. The ECU 10 performs the automated driving of the vehicle according to the traveling plan.

Next, the functional structure of the ECU 10 will be described. The ECU 10 includes a vehicle position recognition unit 11, a surrounding environment recognition unit 12, a traveling state recognition unit 13, a lane change control unit 14, and a turning signal control unit 15.

The vehicle position recognition unit 11 recognizes the position of the vehicle on the map on the basis of the positional information from the GPS receiving unit 1 and the map information in the map database 4. The position of the vehicle on the map is used by the vehicle control system 100 to determine when the lane change control starts during automated driving. The vehicle position recognition unit 11 may recognize the position of the vehicle, using a simultaneous localization and mapping [SLAM] technique, on the basis of the positional information of fixed obstacles, such as electric poles, included in the map information of the map database 4 and the detection result of the external sensor 2.

The vehicle position recognition unit 11 recognizes the lateral position of the vehicle, using a known image processing method, on the basis of an image (an image of white lines) in front of the vehicle which is captured by an in-vehicle camera. The mounting position of the in-vehicle camera in the vehicle is determined and the imaging range of the camera is determined by the mounting position. In addition, the relationship between the mounting position of the camera and the position of the center of the vehicle (positional relationship in a plan view) is determined. Therefore, the vehicle position recognition unit 11 can calculate the position of the center of the vehicle (the lateral position of the vehicle) in a lane width direction from the position of two left and right white lines on the image captured by the camera. The white lines may be recognized by the radar or LIDAR, instead of the camera.

The surrounding environment recognition unit 12 recognizes the surrounding environment of the vehicle on the basis of the detection result of the external sensor 2. The surrounding environment includes, for example, the position of obstacles relative to the vehicle, the speed of obstacles relative to the vehicle, and the moving direction of obstacles relative to the vehicle. The surrounding environment recognition unit 12 recognizes the surrounding environment of the vehicle, using a known method, on the basis of the image captured by the camera, obstacle information from the radar, or obstacle information from the LIDAR.

The traveling state recognition unit 13 recognizes the traveling state of the vehicle. The traveling state of the vehicle includes, for example, the speed of the vehicle, the acceleration of the vehicle, and the steering angle of the vehicle. The traveling state recognition unit 13 recognizes the traveling state of the vehicle on the basis of the detection result of the internal sensor 3. In addition, the traveling state of the vehicle includes the failure state of the vehicle control system 100. The failure state of the vehicle control system 100 includes, for example, a failure in the sensors (for example, the GPS receiving unit 1, the external sensor 2, and the internal sensor 3) of the vehicle, a failure in the actuator 6, such as the steering actuator, a failure in the communication device, a failure in a power supply device, a failure in the electronic control unit, a failure in the turning signals, and a failure in the HMI 8. The vehicle control system 100 determines a failure in each device using a known method. The traveling state recognition unit 13 recognizes the traveling state of the vehicle on the basis of the detection result of the internal sensor 3 and the failure determination information of the vehicle control system 100.

The lane change control unit 14 performs lane change control that changes the lane of the vehicle from the traveling lane to an adjacent lane. The lane change control unit 14 transmits a control signal to the actuator 6 to perform the lane change control.

While the vehicle is being automatically driven, the lane change control unit 14 starts the lane change control on the basis of the position of the vehicle on the map which has been recognized by the vehicle position recognition unit 11. The lane change control unit 14 starts the lane change control according to the traveling plan predetermined for automated driving.

While the vehicle is being manually driven, the lane change control unit 14 starts the lane change control on the basis of the detection result of the operation detection unit 5. When the operation of the user turning on the lane change control start button is detected, the lane change control unit 14 starts the lane change control. The lane change control start operation of the user is not limited to the operation of turning on the start button. The lane change control start operation may be the operation of the driver switching the turning signal close to an adjacent lane of the vehicle from an off state to an on state or the operation of the driver rotating the steering wheel to the adjacent lane with steering torque that is equal to or greater than a predetermined value.

When starting the lane change control, the lane change control unit 14 may notify the driver of the start of the lane change control through the HMI 8. The lane change control unit 14 outputs a sound from the speaker or displays an image on the display to notify the driver of the start of the lane change control.

When starting the lane change control, the lane change control unit 14 sets a target traveling trajectory of the vehicle by the lane change control. The target trajectory means a target traveling trajectory of the vehicle of which the lane is changed from the traveling lane to an adjacent lane by the lane change control. The lane change control unit 14 sets the target trajectory on the basis of the lateral position of the vehicle recognized by the vehicle position recognition unit 11, the surrounding environment of the vehicle recognized by the surrounding environment recognition unit 12, and the traveling state of the vehicle recognized by the traveling state recognition unit 13. In addition, the lane change control unit 14 sets a target vehicle speed pattern (for example, time-series data of a vehicle speed control target value) in the lane change control. The lane change control unit 14 sets the target vehicle speed pattern in which the lateral acceleration of the vehicle is equal to or less than a predetermined value such that the driver does not feel discomfort, on the basis of the current speed of the vehicle. The lane change control unit 14 may use one of a plurality of combinations of the target trajectories and the target vehicle speed patterns which are stored in advance.

The lane change control unit 14 performs the lane change control on the basis of the target trajectory and the target vehicle speed pattern. The lane change control unit 14 performs the lane change control such that the vehicle enters an adjacent lane, on the basis of the lateral position of the vehicle recognized by the vehicle position recognition unit 11, the surrounding environment recognized by the surrounding environment recognition unit 12, and the traveling state of the vehicle recognized by the traveling state recognition unit 13.

The lane change control unit 14 determines whether the lane change of the vehicle has been completed, on the basis of the lateral position of the vehicle recognized by the vehicle position recognition unit 11. For example, when the lateral position of the vehicle reaches the center of an adjacent lane (the center of the adjacent lane in the lane width direction), the lane change control unit 14 determines that the lane change of the vehicle has completed. When the lane change of the vehicle has completed, the lane change control unit 14 ends the lane change control.

During the lane change control, the lane change control unit 14 cancels the lane change control on the basis of at least one of an operation of the driver, the surrounding environment of the vehicle, and the traveling state of the vehicle. The cancellation of the lane change control means the interruption (handover) of the lane change control before a lane change is completed. When predetermined cancellation conditions are satisfied, the lane change control unit 14 cancels the lane change control. The cancellation conditions are conditions for determining whether the cancellation of the lane change control is needed.

When the operation of the driver cancelling the lane change control is detected on the basis of the detection result of the operation detection unit 5, the lane change control unit 14 determines that the cancellation conditions have been satisfied. Examples of the operation of the driver cancelling the lane change control include the operation of the driver applying steering torque that is equal to or greater than a predetermined value to the steering wheel of the vehicle, the operation of the driver applying force that is equal to or greater than a predetermined value to the brake pedal or the accelerator pedal, the operation of the driver depressing the brake pedal or the accelerator pedal with pressure that is equal to or greater than a predetermined value, and the operation of the driver turning on the button for cancelling the lane change control (or the system).

When the driver continuously operates at least one of the steering wheel, the brake pedal, or the accelerator pedal for a predetermined period of time or more, the lane change control unit 14 may determine that the cancellation conditions have been satisfied. When the time integration of the steering torque of the steering wheel by the driver is equal to or greater than a predetermined value, the lane change control unit 14 may determine that the cancellation conditions have been satisfied. Similarly, when the time integration of force applied to (or the amount of depression of) the brake pedal or the accelerator pedal is equal to or greater than a predetermined value, the lane change control unit 14 may determine that the cancellation conditions have been satisfied.

When another vehicle that approaches the vehicle in a predetermined distance range is detected on the basis of the surrounding environment recognized by the surrounding environment recognition unit 12, the lane change control unit 14 determines that the cancellation conditions have been satisfied. When the failure state of the vehicle control system 100 is detected on the basis of the traveling state of the vehicle recognized by the traveling state recognition unit 13, the lane change control unit 14 determines that the cancellation conditions have been satisfied. That is, even if the driver does not perform any operation, the lane change control unit 14 automatically cancels the lane change control on the basis of the surrounding environment or the traveling state. When the lane change control is cancelled, the lane change control unit 14 switches the vehicle to the manual driving mode.

The turning signal control unit 15 switches the turning signals of the vehicle between an off state and an on state. The turning signal control unit 15 transmits a control signal to the turning signal driving unit 7 to control the state of the turning signals. When the vehicle that is being automatically driven starts the lane change control, the turning signal control unit 15 automatically switches the turning signal close to an adjacent lane (lane change direction) from the off state to the on state.

When the vehicle that is being manually driven starts the lane change control and the turning signal that is close to an adjacent lane is in an off state, the turning signal control unit 15 automatically turns on the turning signal. In addition, the driver may manually turn on the turning signal. In any case, the turning signal that is close to an adjacent lane is turned on when the lane change control starts.

When the lane change control ends, the turning signal control unit 15 switches the turning signal from the on state to the off state. When the vehicle enters an adjacent lane, the turning signal control unit 15 may turn off the turning signal.

When the lane change control is cancelled and the vehicle is switched to the manual driving mode, the turning signal control unit 15 maintains the turning signal that is close to an adjacent lane in the on state until predetermined release conditions are satisfied. The release conditions are conditions for determining whether to maintain the turning signal in the on state.

Figure 2A:
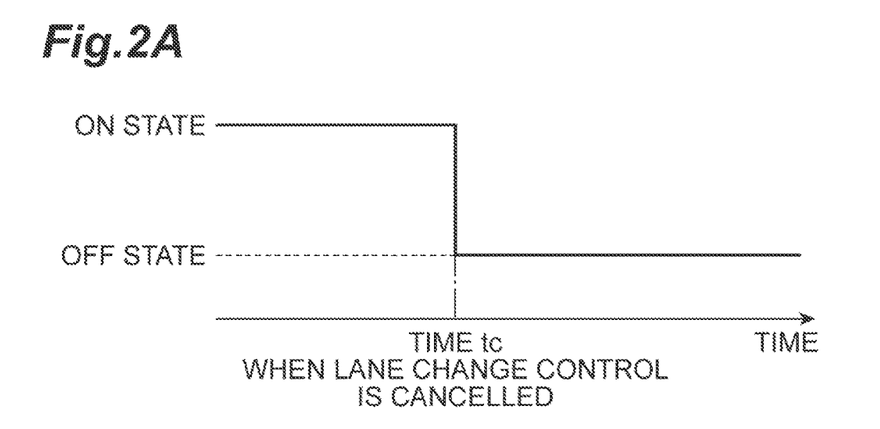
FIG. 2A is a diagram illustrating the state of a turning signal when lane change control is cancelled in a vehicle control system according to the related art.
Figure 2B:
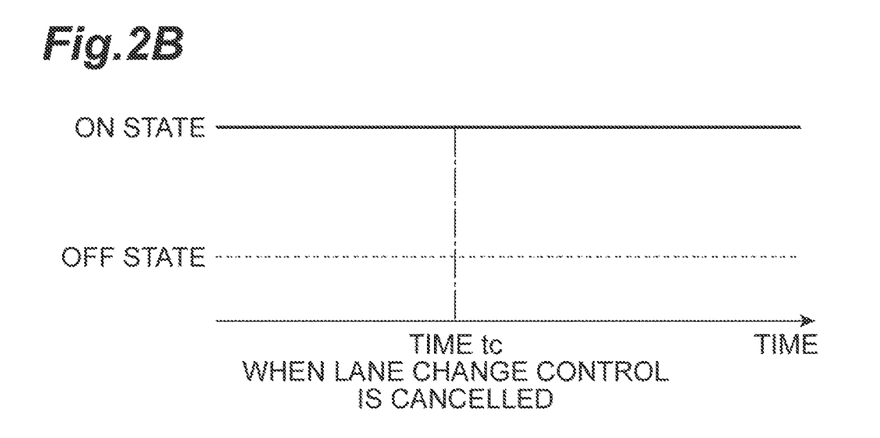
FIG. 2B is a diagram illustrating the state of a turning signal when lane change control is cancelled in a vehicle control system according to this embodiment.

FIG. 2A is a diagram illustrating the state of the turning signal when lane change control is cancelled in the vehicle control system according to the related art. As illustrated in FIG. 2A, in the vehicle control system according to the related art, at a time tc when lane change control is cancelled, the turning signal that is in an on state is automatically turned off. FIG. 2B is a diagram illustrating the state of the turning signal when lane change control is cancelled in the vehicle control system 100 according to this embodiment. As illustrated in FIG. 2B, according to the vehicle control system 100, at a time to when lane change control is cancelled, the turning signal control unit 15 maintains the turning signal in an on state. Therefore, it is possible to avoid the time and effort required for the driver who wants to continue to manually change lanes to manually turn on the turning signal which has been automatically switched to the off state.

Even if the lane change control is cancelled and the vehicle is switched to the manual driving mode, the turning signal control unit 15 does not turn on the turning signal which is in the off state. That is, when the turning signal close to an adjacent lane has already been turned off, for example, when the vehicle has entered the adjacent lane, the turning signal control unit 15 does not switch the turning signal from the off state to the on state even if the lane change control is cancelled.

When the vehicle is switched to the manual driving mode and enters an adjacent lane from the traveling lane, the turning signal control unit 15 determines that the release conditions have been satisfied. The turning signal control unit 15 detects the entrance of the vehicle from the traveling lane to an adjacent lane on the basis of the white lines and the lateral position of the vehicle recognized by the vehicle position recognition unit 11. It is determined that the vehicle enters an adjacent lane from the traveling lane when the center line of the vehicle (a virtual line that passes through the center of the vehicle and extends in the front-rear direction) traverses a white line which is a boundary line between the traveling lane and the adjacent lane. It may be determined that the vehicle enters an adjacent lane from the traveling lane when the front wheel of the vehicle that is close to the adjacent lane traverses the white line. When the driver operates the turning signal operation lever, the turning signal control unit 15 determines that the release conditions have been satisfied.

When a predetermined period of time has elapsed since the lane change control was cancelled and the vehicle was switched to the manual driving mode, the turning signal control unit 15 determines that the release conditions have been satisfied. In addition, when the vehicle has traveled a predetermined distance since the lane change control was cancelled and the vehicle was switched to the manual driving mode, the turning signal control unit 15 may determine that the release conditions have been satisfied. For example, the turning signal control unit 15 calculates the distance traveled from the vehicle speed and the time elapsed.

When the vehicle has moved a predetermined distance in the lateral direction since the lane change control was cancelled and the vehicle was switched to the manual driving mode, the turning signal control unit 15 may determine that the release conditions have been satisfied. The turning signal control unit 15 calculates the moving distance of the vehicle in the lateral direction on the basis of the lateral position of the vehicle recognized by the vehicle position recognition unit 11.

When it is determined that the release conditions have been satisfied, the turning signal control unit 15 releases the maintenance of the on state of the turning signal to turn off the turning signal. When the release conditions are satisfied and the turning signal is turned off, the turning signal control unit 15 may notify the driver that the turning signal has been turned off through the HMI 8. When the maintenance of the on state of the turning signal is released, the turning signal control unit 15 does not necessarily turn off the turning signal.

[Lane Change Control Start Process in Vehicle Control System]

Figure 3:
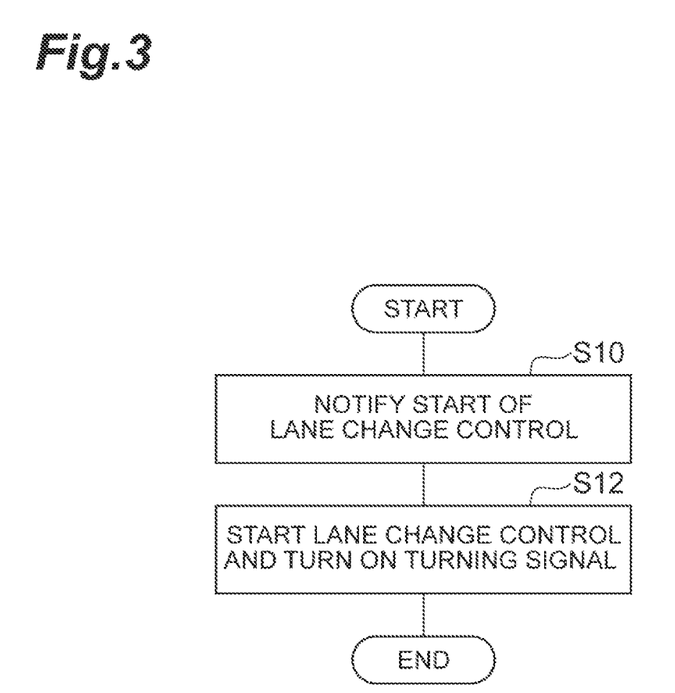
FIG. 3 is a flowchart illustrating a lane change control start process.

Next, the lane change control start process in the vehicle control system 100 according to this embodiment will be described. FIG. 3 is a flowchart illustrating the lane change control start process. The process in the flowchart illustrated in FIG. 3 is performed when the lane change control is determined to start by automated driving or when the driver performs a lane change control start operation.

As illustrated in FIG. 3, in S10, the ECU 10 of the vehicle control system 100 notifies the driver of the start of the lane change control through the HMI 8. The HMI 8 outputs a sound or displays an image to notify the driver of the start of the lane change control in response to a control signal transmitted from the lane change control unit 14. Then, the ECU 10 proceeds to S12.

In S12, the lane change control unit 14 of the ECU 10 starts the lane change control. The lane change control unit 14 transmits a control signal to the actuator 6 to perform the lane change control that changes the lane of the vehicle from the traveling lane to an adjacent lane. In S12, when the turning signal close to the adjacent lane is in an off state, the turning signal control unit 15 automatically turns on the turning signal. The turning signal control unit 15 transmits a control signal to the turning signal driving unit 7 to turn on the turning signal.

[Lane Change Control End Process and Lane Change Control Cancellation Process in Vehicle Control System]

Figure 4:
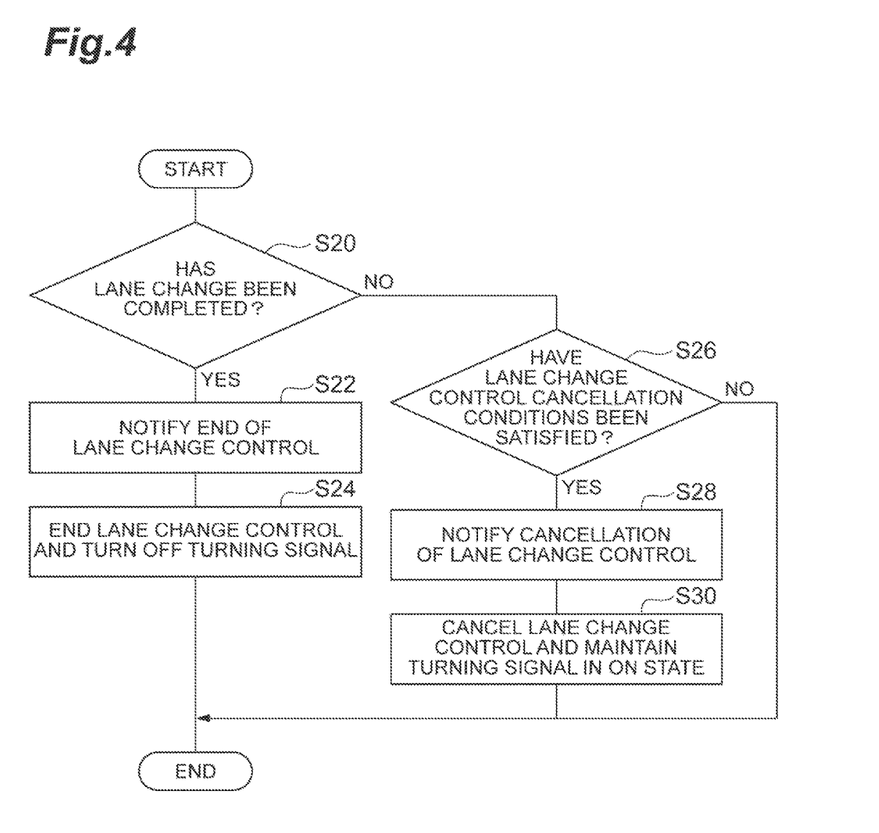
FIG. 4 is a flowchart illustrating a lane change control end process and a lane change control cancellation process.

Next, a lane change control end process and a lane change control cancellation process in the vehicle control system 100 will be described with reference to FIG. 4. FIG. 4 is a flowchart illustrating the lane change control end process and the lane change control cancellation process. The processes in the flowchart illustrated in FIG. 4 are performed when the lane change control starts in S12 of FIG. 3.

As illustrated in FIG. 4, in S20, the lane change control unit 14 of the ECU 10 in the vehicle control system 100 determines whether a lane change has been completed by the lane change control. The lane change control unit 14 determines whether a lane change has been completed on the basis of the lateral position of the vehicle recognized by the vehicle position recognition unit 11. When it is determined that a lane change has been completed (S20: YES), the ECU 10 proceeds to S22. When it is determined that a lane change has not been completed (S20: NO), the ECU 10 proceeds to S26.

In S22, the ECU 10 notifies the driver that the lane change control has ended through the HMI 8. The HMI 8 outputs a sound or displays an image to notify the driver that the lane change control has ended, in response to a control signal transmitted from the lane change control unit 14. Then, the ECU 10 proceeds to S24.

In S24, the lane change control unit 14 of the ECU 10 ends the lane change control. When the turning signal is in an on state, the turning signal control unit 15 switches the turning signal to an off state. When the vehicle enters an adjacent lane from the traveling lane during the lane change control, the turning signal control unit 15 may switch the turning signal close to the adjacent lane to an off state. Then, the ECU 10 ends the current process.

In S26, the lane change control unit 14 of the ECU 10 determines whether the cancellation conditions have been satisfied. For example, when the operation of the driver cancelling the lane change control is detected on the basis of the detection result of the operation detection unit 5, the lane change control unit 14 determines that the cancellation conditions have been satisfied. When another vehicle that approaches the vehicle in a predetermined distance range is detected on the basis of the surrounding environment recognized by the surrounding environment recognition unit 12, the lane change control unit 14 determines that the cancellation conditions have been satisfied. When it is determined that the cancellation conditions have not been satisfied (S26: NO), the ECU 10 ends the current process. Then, the ECU 10 repeats the process from S20 again. When it is determined that the cancellation conditions have been satisfied (S26: YES), the ECU 10 proceeds to S28.

In S28, the ECU 10 notifies the driver that the lane change control has been cancelled through the HMI 8. The HMI 8 outputs a sound or displays an image to notify the driver that the lane change control has been cancelled, in response to a control signal transmitted from the lane change control unit 14. Then, the ECU 10 proceeds to S30.

In S30, the lane change control unit 14 of the ECU 10 cancels the lane change control. The ECU 10 switches the vehicle, for which the lane change control has been cancelled, to the manual driving mode. In this case, the turning signal control unit 15 maintains the turning signal close to the adjacent lane in the on state. Then, the ECU 10 ends the current process.

[Turning Signal Release Process in Vehicle Control System]

Figure 5:
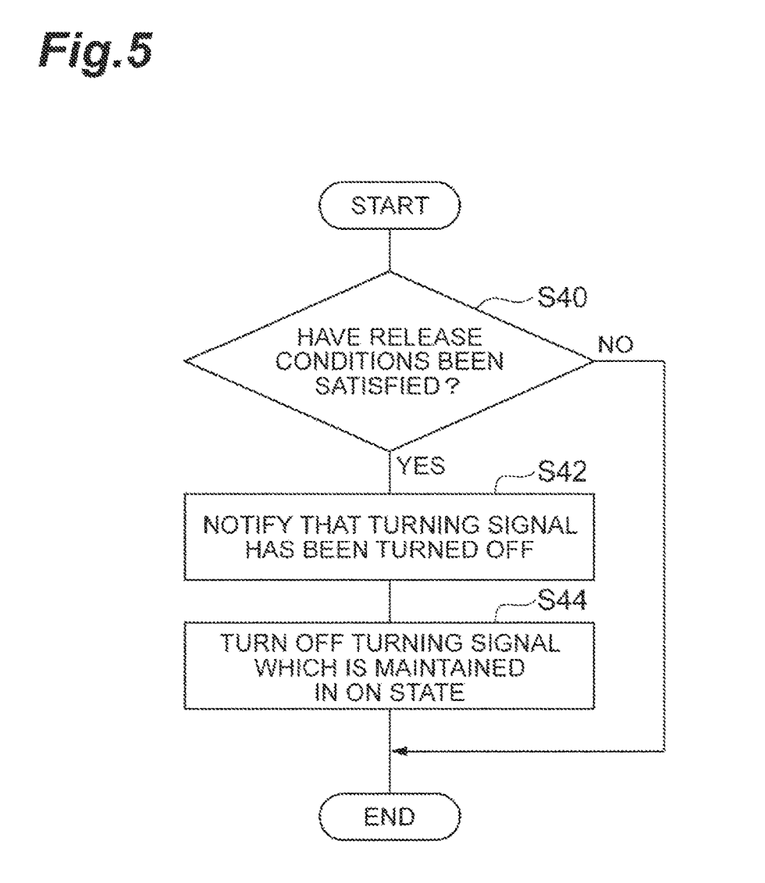
FIG. 5 is a flowchart illustrating a process of releasing the turning signal which is maintained in an on state.

Next, a turning signal release process in the vehicle control system 100 will be described with reference to FIG. 5. FIG. 5 is a flowchart illustrating a process of releasing the turning signal which is maintained in an on state. The process in the flowchart illustrated in FIG. 5 is performed when the turning signal is maintained in the on state in S30 of FIG. 4.

As illustrated in FIG. 5, in S40, the lane change control unit 14 of the ECU 10 in the vehicle control system 100 determines whether the release conditions have been satisfied. When the vehicle which has been switched to the manual driving mode enters an adjacent lane from the traveling lane, the lane change control unit 14 determines that the release conditions have been satisfied. When a predetermined period of time has elapsed since the lane change control was cancelled and the vehicle was switched to the manual driving mode, the lane change control unit 14 determines that the release conditions have been satisfied. When it is determined that the release conditions have not been satisfied (S40: NO), the ECU 10 ends the current process. Then, the ECU 10 repeats the process in S40 again. When it is determined that the release conditions have been satisfied (S40: YES), the ECU 10 proceeds to S42.

In S42, the ECU 10 notifies the driver that the turning signal has been turned off through the HMI 8. The HMI 8 outputs a sound or displays an image to notify the driver that the turning signal has been turned off, in response to a control signal transmitted from the turning signal control unit 15. Then, the ECU 10 proceeds to S44.

In S44, the turning signal control unit 15 of the ECU 10 turns off the turning signal. The turning signal control unit 15 releases the maintenance of the on state of the turning signal and turns off the turning signal. The turning signal control unit 15 transmits a control signal to the turning signal driving unit 7 to turn off the turning signal. Then, the ECU 10 ends the current process.

[Operation and Effect of Vehicle Control System]

According to the above-mentioned vehicle control system 100 according to this embodiment, when the lane change control is cancelled by, for example, an operation of the user during the lane change control and the vehicle is switched to the manual driving mode, the turning signal is maintained in an on state. Therefore, according to the vehicle control system 100, the time and effort required for the driver to turn on the turning signal again is not needed, as compared to the system according to the related art in which the turning signal is automatically turned off when lane change control is cancelled. As a result, according to the vehicle control system 100, it is possible to improve the convenience of the driver who manually changes lanes when lane change control is cancelled.

According to the vehicle control system 100, when the vehicle enters an adjacent lane from the traveling lane, it is determined that the release conditions have been satisfied even if the turning signal is maintained in an on state. Then, the turning signal is turned off. When the driver manually changes lanes such that the vehicle enters an adjacent lane from the traveling lane, the turning signal can be turned off without being operated by the driver. As a result, it is possible to improve the convenience of the driver. In addition, when the vehicle enters an adjacent lane from the traveling lane, the turning signal is turned off. Therefore, it is possible to prevent the drivers of neighboring vehicles from misunderstanding that the vehicle changes its lane to a lane adjacent to the adjacent lane, as compared to a case in which the turning signal is maintained in an on state until lane change control ends.

The preferred embodiment of the invention has been described above, but the invention is not limited to the above-described embodiment. Various modifications and various improved structures of the invention including the above-described embodiment can be made on the basis of the knowledge of those skilled in the art.

For example, the vehicle control system 100 does not necessarily perform automated driving. In this case, the vehicle control system 100 may perform lane change control as drive assist that assists the manual driving of the driver. When the lane change control as the drive assist ends, the vehicle control system 100 changes the driving state of the vehicle to a state in which the driver manually drives the vehicle. After the lane change control as the drive assist ends, the vehicle control system 100 may start other types of drive assist such as lane keeping assist. When the vehicle control system 100 performs lane change control as automated driving, the lane change control is not necessarily performed as the drive assist during manual driving. The vehicle control system 100 may perform both lane change control as automated driving and lane change control as drive assist.

In the above-described embodiment, the vehicle control system 100 includes the GPS receiving unit 1 and the map database 4. However, the GPS receiving unit 1 and the map database 4 are not indispensable. In addition, the HMI 8 is not indispensable. That is, in the above-described embodiment, various notifications are transmitted to the driver by the HMI 8. However, the notification to the driver is not indispensable. In addition, the conditions for releasing the turning signal that is maintained in an on state do not necessarily include the entrance of the vehicle from the traveling lane to an adjacent lane.

REFERENCE SIGNS LIST

1: GPS receiving unit
2: external sensor
3: internal sensor

4: map database
5: operation detection unit
6: actuator
7: turning signal driving unit
11: vehicle position recognition unit
12: surrounding environment recognition unit
13: traveling state recognition unit
14: lane change control unit
15: turning signal control unit
100: vehicle control system

What is claimed is:

1. A vehicle control system that performs lane change control for changing a lane of a vehicle from a traveling lane to an adjacent lane, cancels the lane change control according to at least one of an operation of a driver of the vehicle, a surrounding environment of the vehicle, and a traveling state of the vehicle during the lane change control, and switches the vehicle to a mode in which the driver manually drives the vehicle, the system comprising:

a turning signal control unit configured to switch a turning signal of the vehicle between an off state and an on state according to the lane change control, wherein the turning signal control unit maintains the turning signal in the on state until predetermined release conditions are satisfied when the lane change control in process is cancelled and the vehicle is switched to the manual driving mode.

2. The vehicle control system according to claim 1, wherein, when the vehicle enters the adjacent lane from the traveling lane after the lane change control in process is cancelled and the vehicle is switched to the manual driving mode, the turning signal control unit determines that the release conditions are satisfied and switches the turning signal to the off state.

3. The vehicle control system according to claim 1, wherein, when the predetermined release conditions are satisfied, the turning signal control unit switches the turning signal to the off state.

* * * * *